Feb. 6, 1945.   D. M. LIGHT   2,368,856
TRUCK
Filed Aug. 20, 1941   2 Sheets-Sheet 1

INVENTOR.
David M. Light

Feb. 6, 1945. D. M. LIGHT 2,368,856
TRUCK
Filed Aug. 20, 1941 2 Sheets-Sheet 2
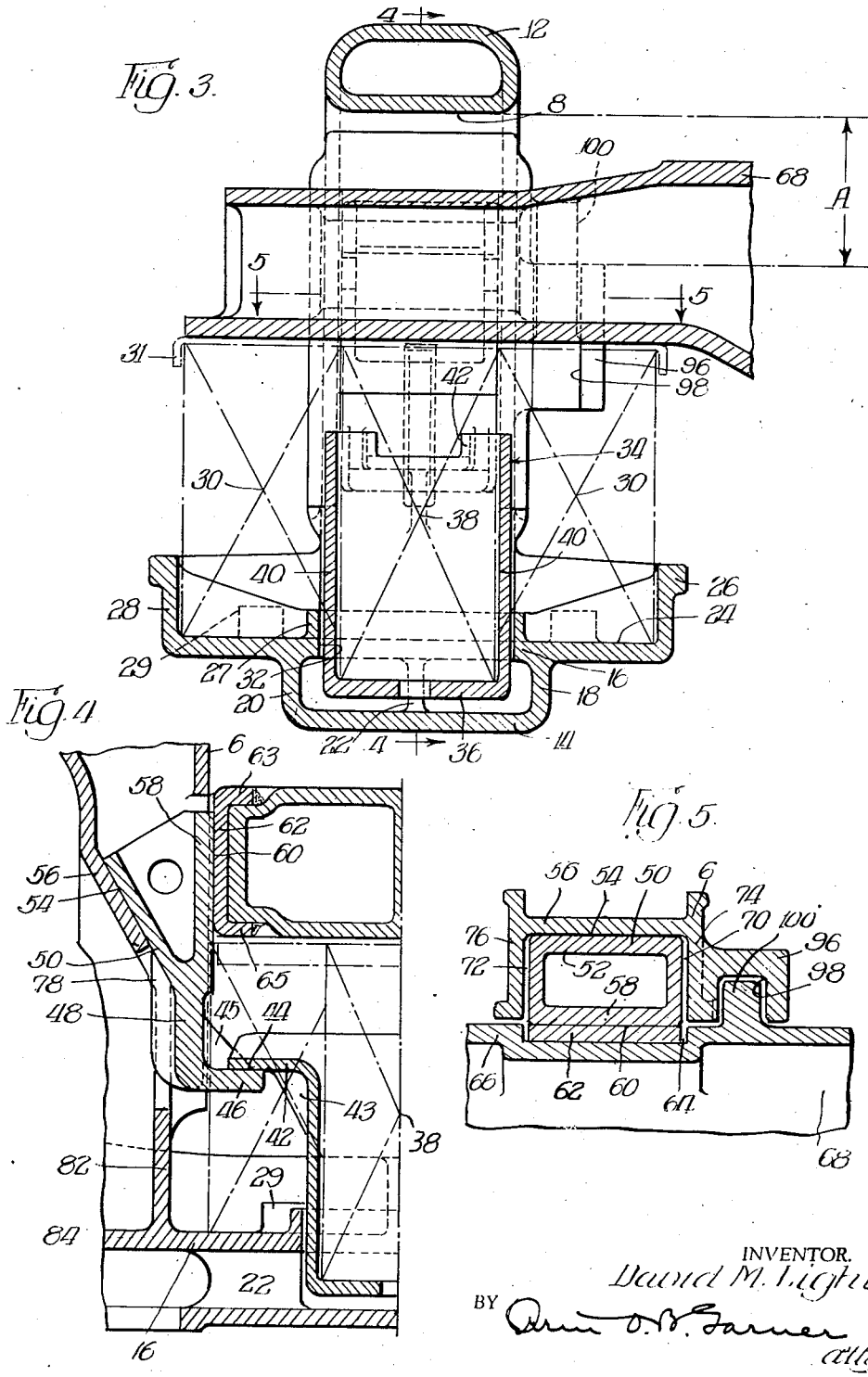
INVENTOR.
David M. Light,
BY

Patented Feb. 6, 1945

2,368,856

UNITED STATES PATENT OFFICE 2,368,856

TRUCK

David M. Light, Chicago, Ill., assignor to American Steel Foundries, Chicago, Ill., a corporation of New Jersey Application August 20, 1941, Serial No. 407,522

24 Claims. (Cl. 105—197)

My invention relates to a railway car truck and more particularly to a four wheel railway car truck utilizing a novel spring suspension comprising friction elements in engagement with the columns of the frame and with the side walls of the bolster, said friction elements having a novel form of engagement with certain of the bolster supporting springs.

The general object of my invention is to devise a novel form of railway freight car truck of the above type suitable for high-speed freight car service and adapted to development of varying amounts of friction as may be required under different operating conditions.

A specific object of my invention is to devise a high-speed quick wheel change type of freight car truck utilizing truss side frames with central bolster openings in which the ends of the load carrying member or bolster may be spring supported, the side walls of the bolster having frictional engagement with a novel form of friction member, said friction member also having frictional engagement with surfaces on the columns and affording support for a long travel spring which, in turn, may carry a portion of the bolster load.

In my novel arrangement, the truck comprises a side frame having a two-level tension member, the upper level affording a seat for a plurality of long travel coil springs, said upper level being cut away centrally of the frame to afford an opening for an auxiliary spring seat which may be carried on friction blocks and may, in turn, support a somewhat longer bolster supporting coil spring.

My novel arrangement contemplates a structure such as that above described wherein friction shoes mounted in the opposite columns may afford means of support for an auxiliary spring pocket suspended at an intermediate point in the bolster opening.

In the drawings,

Figure 3 is a sectional view of the truck arrangement shown in Figures 1 and 2, the section being taken substantially in the transverse vertical plane bisecting the truck and as indicated by the line 3—3 of Figure 1.

Figure 4 is a further fragmentary sectional view taken substantially in the vertical longitudinal plane bisecting the side frame and as indicated by the line 4—4 of Figure 3, and Figure 5 is a fragmentary sectional view taken through one side of the bolster and the adjacent column substantially in the horizontal plane indicated by the line 5—5 of Figure 3.

Figure 1:
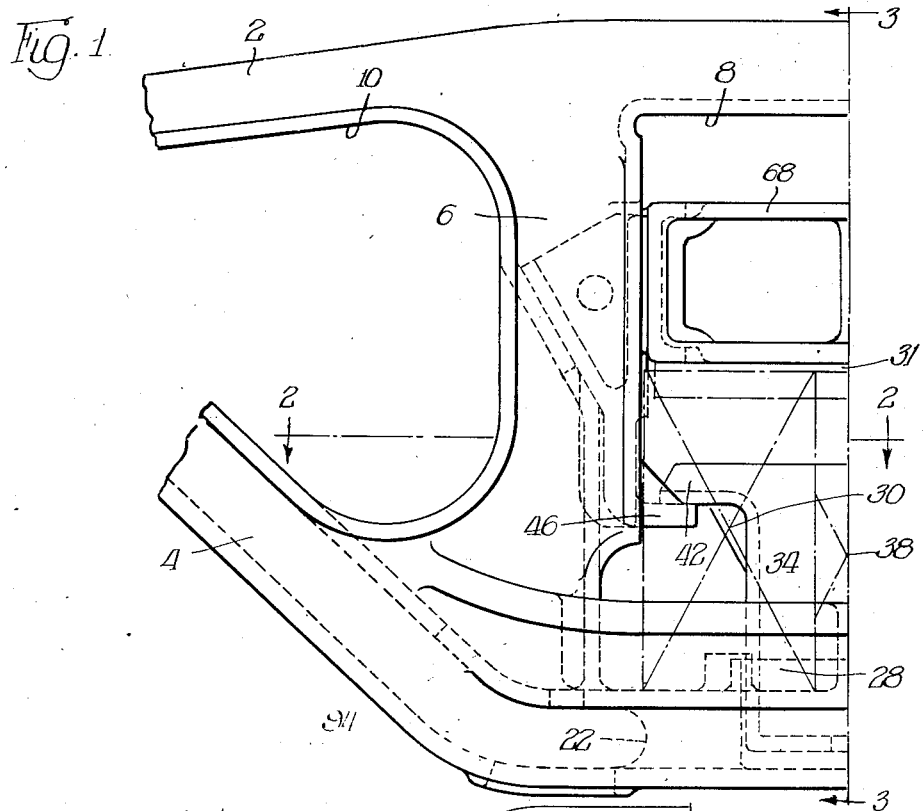
Figure 1 is a fragmentary side elevation of a railway car truck embodying my invention.

Describing the structure in detail, my novel truck comprises a truss side frame having the usual outline with the compression member 2, the tension member 4, and the integrally formed column 6 merging therewith and forming the central bolster opening 8 and the adjacent window opening 10. Only one-half of the frame is shown inasmuch as the structure is similar at opposite ends. Above the bolster opening 8, the compression member may be of box-section as best seen at 12 in the sectional view of Figure 3, and below the bolster opening, the tension member may have a box-section with a bottom chord 14, a top chord 16, inboard and outboard side walls 18 and 20, and spaced vertical longitudinal reinforcing ribs 22, 22, said top chord 16 being widened beneath said bolster opening to form a main spring seat 24 and formed with upstanding flanges inboard and outboard thereof designated respectively 26 and 28 and affording retaining means for coil springs seated thereon, said coil springs being diagrammatically indicated as at 30, 30 and being symmetrically seated on the seat 24 as may best be understood from a consideration of the top plan view of Figure 2.

Positioning means 29, 29 may be formed on the seat 24 for the springs 30, 30 and an annular flange 27 may be formed on the web 16 around the opening 32 therein. Centrally of the spring seat 24, the top chord 16 is interrupted to form the before-mentioned opening 32 for reception of the auxiliary spring pocket generally designated 34 and comprising a bottom wall 36 affording a seat for the relatively long bolster supporting spring group diagrammatically indicated at 38. The upper ends of the springs 30 and 38 may be confined by a spring plate 31 upon which the end of the bolster may seat in usual manner. The spring pocket 34 may be of generally cylindrical form with annular side walls 40, 40, and at its upper end, said pocket is afforded lateral lugs 42 of U-section each reinforced by a vertical rib 43, said lugs affording supporting arms for said auxiliary spring pocket each of which may be positioned as at 44 on a seat 46 afforded on the bottom leg 48 formed as an integral part of the friction shoe generally designated 50. The seat 46 may be reinforced by triangular lateral gussets 45 and 47 (Figure 2) at opposite sides thereof. The friction shoe 50 may have an upper portion of flaring cup-like form, rectangular in section as seen in Figure 5, and comprising an outer wall 52 in frictional engagement as at 54 with a diagonal transverse wall 56 integrally formed in the adjacent column 6; the top portion of said friction shoe also comprising a vertical inner wall 58 in frictional engagement as at 60 with the wear plate 62 recessed as at 64 in the side wall 66 of the bolster generally designated 68. The wear plate or friction panel 62 may be flanged over top and bottom as at 63 and 65 (Figure 4) and recessed in the top and bottom walls of said bolster as best seen in said Figure 4.

Figure 2:
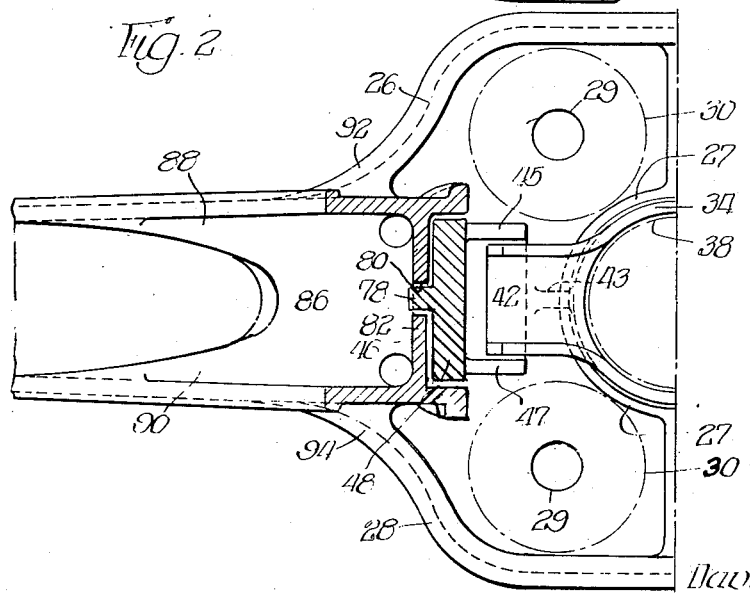
Figure 2 is a fragmentary top plan view of the truck structure shown in Figure 1, partially in section, the section being taken substantially in the horizontal plane indicated by the line 2—2 of Figure 1.

The inboard and outboard walls of the cup-like top portion of each friction shoe are afforded clearance as at 70 and 72 (Figure 5) from the inboard and outboard walls 74 and 76 of the adjacent column, said column having a general H-shaped section in the plane of Figure 5. The bottom leg 48 of each friction shoe is formed with a vertical rib or flange 78 slidably receivable in the vertical slot 80 formed in the adjacent vertical transverse web 82 of the column, said vertical web 82 being a continuation of the beforementioned diagonal web 56. The vertical transverse web 82 of the column merges as at 84 (Figure 4) with the top chord 16 of the tension member and said top chord may be continued outwardly of the column as at 86 (Figure 2) where it may take a bifurcated form to merge with the inboard and outboard walls of the tension member as at 88 and 90. The side walls 26 and 28 of the spring seat portion of the tension member may converge on opposite sides of the column and merge therewith as at 92 and 94 (Figure 2).

On the inboard face of each column is formed a bracket 96 (Figure 5) defining with said column a vertical channel 98 for reception of the vertical guide flange 100 formed on the adjacent side wall 66 of the bolster, thus providing for interlocking the bolster with the side frame. It may be noted that the vertical depth of the flange 96 is somewhat restricted, the top thereof being afforded a clearance A (Figure 3) below the bottom web of the compression member, said distance A being equal to or slightly greater than the depth of the bolster at the guide lug 100 on the side wall thereof so that the bolster may be inserted into the bolster opening or removed therefrom without disturbing the spring group therebelow.

In operation, it will be understood that the bolster is directly supported from the tension member through the coil springs 30, 30 seated on the top chord 16 of said tension member, and the bolster is afforded auxiliary support by the central spring 38 which is confined within the spring pocket 34. The said spring pocket 34 will have some vertical play due to the movement of the friction shoes 50, 50 on which it is supported, and said friction shoes will develop friction with the bolster and with the abutting friction surface of the column. The amount of friction developed may be modified by the character of the spring 38 as well as by the steepness of the angle included between the side wall of the bolster and the diagonal wall of the adjacent column within which each friction shoe is confined.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a railway car truck, a side frame having tension and compression members and spaced columns defining a bolster opening, said tension member having beneath said bolster opening a box-section with top and bottom chords, said top chord being widened and formed with upstanding flanges defining a spring seat, main bolster supporting springs on said seat, an opening in said top chord, an auxiliary spring seat recessed in said opening, a bolster extending into said bolster opening, friction shoes housed in respective columns in frictional wedge engagement therewith and with the side walls of said bolster, means on said shoes affording support for said auxiliary seat, an auxiliary bolster supporting spring on said auxiliary spring seat, each of said columns having bolster guide means in the form of an inboard bracket defining with the adjacent column a vertical channel, and a guide rib on the adjacent side wall of said bolster received in said channel, said bolster guide ribs having a depth less than the vertical clearance between said bracket and the compression member thereabove to permit assembly of said bolster at the top of said bolster opening.

2. In a railway car truck, a side frame having tension and compression members and spaced columns defining a bolster opening, said tension member having beneath said bolster opening a box-section with top and bottom chords, said top chord being widened and formed with upstanding flanges defining a spring seat, an opening in said top chord, an auxiliary spring seat recessed in said opening, a bolster extending into said bolster opening, friction shoes housed in respective columns in wedge engagement therewith and with the side walls of said bolster, interengaging means on said shoes and said auxiliary spring seat affording support for said auxiliary seat, springs on said seats supporting said bolster, each of said columns having bolster guide means in the form of an inboard bracket defining with the adjacent column a vertical channel, and a guide rib on the adjacent side wall of said bolster received in said channel, said guide ribs having a depth less than the clearance between said compression member and the top of said bracket to permit assembly of said bolster at the top of said bolster opening.

3. In a railway car truck, a truss side frame having tension and compression members and spaced columns defining a central bolster opening, each of said columns having an H-section with a diagonal transverse web, a bolster extending into said opening, coil springs on said tension member in said opening supporting said bolster, a friction shoe housed in each of said columns in frictional engagement with the adjacent transverse web and a side wall of said bolster, a spring pocket supported on said shoes and recessed in said tension member, an auxiliary spring positioned in said pocket for support of said bolster, each of said columns having bolster guide means in the form of an inboard bracket defining with the adjacent column a vertical channel and a guide rib on the adjacent side wall of said bolster received in said channel, said bolster guide ribs having a depth less than the vertical clearance between said bracket and the compression member thereabove to permit assembly of said bolster at the top of said bolster opening.

4. In a railway car truck, a side frame having tension and compression members and spaced columns defining a bolster opening, said tension member having beneath said bolster opening a box-section with top and bottom chords, said top chord being widened and formed with upstanding flanges defining a spring seat, main bolster supporting springs on said seat, an opening in said top chord, an auxiliary spring seat recessed in said opening, a bolster extending into said bolster opening, friction shoes housed in respective columns in wedge engagement therewith and with the side walls of said bolster, interengaging means on said shoes and said auxiliary spring seat affording support for said seat, an auxiliary bolster supporting spring on said auxiliary spring seat, each of said columns having bolster guide means in the form of an inboard bracket defining with the adjacent column a vertical channel, and guide ribs on the adjacent side walls of said bolster received in said channels.

5. In a car truck, a truss side frame having a compression member, a tension member and spaced columns defining a bolster opening, each of said columns having merging vertical and diagonal transverse webs, friction shoes recessed in said columns in frictional engagement with said diagonal webs and in interlocking engagement with said vertical webs, said tension member having a top chord defining a main spring seat, springs thereon, an auxiliary spring pocket supported by said shoes and recessed in said tension member, an auxiliary spring in said pocket, a bolster extending into said opening and seated on all of said springs, said bolster having side walls in frictional engagement with said shoes, and each of said columns having an inboard bracket defining with the adjacent column a vertical channel, said bolster having vertical guide lugs in cooperative engagement with said channels, each of said vertical guide lugs having a depth less than the vertical clearance between said inboard brackets and said compression member.

6. In a railway car truck, a side frame having tension and compression members and spaced columns defining a bolster opening, vertical slots in said columns, said tension member having beneath said bolster opening a box-section with top and bottom chords, said top chord being widened and formed with upstanding flanges defining a spring seat, an opening in said top chord, an auxiliary spring seat recessed in said opening, a bolster extending into said bolster opening, friction shoes housed in respective columns in wedge engagement between said columns and the adjacent side walls of said bolster, interengaging means on said shoes and said auxiliary spring seat affording support for said seat, springs on said seats supporting said bolster, each of said columns having bolster guide means in the form of an inboard bracket defining with the adjacent column a vertical channel, and guide ribs on the adjacent side walls of said bolster received in said channels, each of said friction shoes having a vertical flange in cooperative engagement with the vertical slot of the associated column.

7. In a car truck, a truss side frame having a compression member, a tension member and spaced columns defining a bolster opening, each of said columns having merging vertical and diagonal transverse webs, friction shoes recessed in said columns in frictional engagement with said diagonal webs and in interlocking engagement with said vertical webs, said tension member having a top chord defining a main spring seat, springs thereon, an auxiliary spring pocket supported by said shoes and recessed in said tension member, an auxiliary spring in said pocket, a bolster extending into said opening and seated on all of said springs, said bolster having side walls in frictional engagement with said shoes, and each of said columns having an inboard bracket defining with the adjacent column a vertical channel, said bolster having vertical guide lugs in cooperative engagement with said channels.

8. In a railway car truck, a truss side frame having a tension member and spaced columns defining in part a central bolster opening, each of said columns having an H-section with a diagonal transverse web, a bolster extending into said opening, coil springs on said tension member in said opening supporting said bolster, a friction shoe housed in each of said columns in frictional engagement with the adjacent transverse web and a side wall of said bolster, a spring pocket supported on said shoes and recessed in said tension member, an auxiliary spring positioned in said pocket for support of said bolster, each of said columns having bolster guide means in the form of an inboard bracket defining with the adjacent column a vertical channel, and guide ribs on the adjacent side walls of said bolster received in said channels.

9. In a railway car truck, a truss side frame having tension and compression members and spaced columns defining a bolster opening, each of said columns having a diagonal transverse web, a bolster supported in said bolster opening, friction shoes confined between each side wall of the bolster and the adjacent transverse web, said friction shoes affording support for an auxiliary bolster supporting spring, each of said columns having bolster guide means in the form of an inboard bracket defining with the adjacent column a vertical channel, and guide ribs on the adjacent side walls of said bolster received in said channels, said bolster at said guide ribs having a depth less than the clearance between the portion of said bracket defining said channel and the bottom web of said compression member thereabove to permit assembly of said bolster at the top of said bolster opening.

10. In a railway car truck, a side frame having tension and compression members and spaced columns defining a bolster opening, said tension member having beneath said bolster opening a box-section with top and bottom chords, said top chord being widened and formed with upstanding flanges defining a spring seat, main bolster supporting springs on said seat, an opening in said top chord, an auxiliary spring seat recessed in said opening, a bolster extending into said bolster opening, friction shoes housed in respective columns in wedge engagement between said columns and the adjacent side walls of said bolster, interengaging means on said shoes and said auxiliary spring seat affording support for said auxiliary seat, and a bolster supporting spring on said auxiliary spring seat.

11. In a railway car truck, a side frame having a compression member, a tension member and spaced columns defining a bolster opening, each of said columns having merging vertical and diagonal transverse webs, said tension member having a widened top chord defining a spring seat, a spring group on said seat, an auxiliary spring seat recessed in said top chord, a relatively long travel spring positioned on said auxiliary spring seat, a bolster projecting into said bolster opening and positioned on all of said springs, friction shoes recessed in respective columns in wedge engagement between said diagonal webs and the adjacent side walls of said bolster, and a connection between each of said shoes and said auxiliary spring seat.

12. In a railway car truck, a side frame having a compression member, a tension member and spaced columns defining a bolster opening, each of said columns having merging vertical and diagonal transverse webs, said tension member having a widened top chord defining a spring seat, a spring group on said seat, an auxiliary spring seat recessed in said top chord, a relatively long travel spring positioned on said auxiliary spring seat, a bolster projecting into said bolster opening and positioned on all of said springs, and friction shoes recessed in said columns in frictional engagement between said diagonal webs and the adjacent side walls of said bolster, said friction shoes having shelf-like means affording support for said auxiliary spring seat.

13. In a car truck, a truss side frame having a compression member, a tension member and spaced columns defining a bolster opening, each of said columns having merging vertical and diagonal transverse webs, friction shoes recessed in said columns in frictional engagement with said diagonal webs and in interlocking engagement with said vertical webs, said tension member having a top chord defining a main spring seat, springs thereon, an auxiliary spring pocket supported by said shoes and recessed in said tension member, an auxiliary spring in said pocket, and a bolster extending into said opening and seated on all of said springs, said bolster having side walls in frictional engagement with said shoes.

14. In a railway car truck, a side frame having a compression member, a tension member and spaced columns defining a bolster opening, each of said columns having merging vertical and diagonal transverse webs, said tension member having a widened top chord defining a spring seat, a spring group on said seat, an auxiliary spring seat recessed in said top chord, a relatively long travel spring positioned on said auxiliary spring seat, a bolster projecting into said bolster opening and positioned on all of said springs, and friction shoes recessed in respective columns in frictional engagement between said diagonal webs and the adjacent side walls of said bolster and affording support for said auxiliary spring seat.

15. In a railway car truck, a side frame having tension and compression members and spaced columns defining a bolster opening, vertical slots in said columns, said tension member having beneath said bolster opening a box-section with top and bottom chords, said top chord being widened and formed with upstanding flanges defining a spring seat, an opening in said top chord, an auxiliary spring seat recessed in said opening, a bolster extending into said bolster opening, friction shoes housed in respective columns in wedge engagement between said columns and the adjacent side walls of said bolster, each of said friction shoes having a vertical flange in cooperative engagement with the vertical slot of the associated column, interengaging means on said shoes and said auxiliary spring seat affording support for said auxiliary seat, and springs on said seats supporting said bolster.

16. In a railway car truck, a truss side frame having a tension member and spaced columns defining in part a central bolster opening, each of said columns having an H-section with a diagonal transverse web, a bolster extending into said opening, coil springs on said tension member in said opening supporting said bolster, a friction shoe housed in each of said columns in frictional engagement with the adjacent transverse web and a side wall of said bolster, a spring pocket supported on said shoes and recessed in said tension member, and an auxiliary spring positioned in said pocket for support of said bolster.

17. In a railway car truck, a truss side frame having tension and compression members and spaced columns defining a bolster opening, each of said columns having a diagonal transverse web, a bolster supported in said bolster opening, friction shoes wedged between each side wall of the bolster and the adjacent transverse web, means extending between said friction shoes, and an auxiliary bolster supporting spring carried on said last-mentioned means.

18. In a truck, a side frame having a tension member and spaced columns defining in part a bolster opening, a spring seat on the top chord of said tension member, springs thereon, an auxiliary spring pocket recessed in said tension member, an auxiliary spring therein, a bolster seated in said opening on all of said springs, and friction shoes wedged between respective columns and the adjacent side walls of said bolster and affording support for said auxiliary spring pocket.

19. In a railway car truck, a truss side frame having tension and compression members and spaced columns defining a bolster opening, each of said columns having a diagonal transverse web, a bolster supported in said bolster opening, and friction shoes wedged between each side wall of the bolster and the adjacent transverse web, a member extending between said shoes and supported thereon, and an auxiliary bolster supporting spring carried on said last-mentioned member.

20. In a railway car truck, a truss side frame having spaced columns defining in part a bolster opening, a spring group in said opening comprising main and auxiliary springs, a bolster seated on said springs, and shoes wedged between said bolster and the adjacent columns for frictional engagement therewith, said shoes having depending means affording support for a member extending therebetween and affording a seat for said auxiliary spring.

21. In a railway car truck, a side frame having spaced columns, a bolster opening therebetween, main and auxiliary springs in said opening, a bolster supported on said springs, friction shoes wedged between said columns and the adjacent bolster walls, and a member supported from said shoes and affording a spring seat for said auxiliary spring.

22. In a railway car truck, a side frame having spaced columns, a bolster opening therebetween, main and auxiliary springs in said opening, a bolster supported on said springs, friction shoes wedged between said columns and the adjacent bolster walls, and a member supported from said shoes and affording a spring seat for said auxiliary spring, said auxiliary spring having a relatively great length as compared with said main springs.

23. In a railway car truck, a truss side frame having spaced columns defining in part a bolster opening, a spring group in said opening comprising main and auxiliary springs, a bolster seated on said springs, and shoes wedged between said bolster and the adjacent columns for frictional engagement therewith, said shoes having depending means affording support for a member extending therebetween and affording a seat for said auxiliary spring, said auxiliary spring having a relatively great length as compared with said main springs.

24. In a railway car truck, a truss side frame having a tension member and spaced columns, a bolster opening between said columns, a bolster in said opening, main and auxiliary springs in said opening supporting said bolster, said main springs being seated on said tension member, friction shoes wedged between respective columns and said bolster, and an auxiliary spring support carried by and extending between said shoes and affording a seat for said auxiliary spring below said first-mentioned seat.

DAVID M. LIGHT.